US005460473A

United States Patent [19]
LaMora et al.

[11] Patent Number: 5,460,473
[45] Date of Patent: Oct. 24, 1995

[54] DOUBLE CONTAINER TRAILER

[75] Inventors: Robert LaMora, Glassboro; Steven N. David, Sicklerville, both of N.J.

[73] Assignee: Accurate Industries, Inc., Erial, N.J.

[21] Appl. No.: 234,914

[22] Filed: Apr. 28, 1994

[51] Int. Cl.⁶ .............................. B65G 67/02; B60P 1/04
[52] U.S. Cl. ............................................. 414/494; 414/500
[58] Field of Search ...................... 414/491–494, 414/498, 500, 501, 478, 483, 679, 349, 350

[56] References Cited

U.S. PATENT DOCUMENTS

| | | | |
|---|---|---|---|
| 2,741,383 | 4/1956 | Leckert | 414/491 X |
| 3,001,825 | 9/1961 | Rouse | 414/501 X |
| 4,109,810 | 8/1978 | Jones | 414/494 X |
| 4,645,405 | 2/1987 | Cambiano | 414/500 X |
| 4,986,719 | 1/1991 | Galbreath | 414/494 X |
| 5,000,645 | 3/1991 | Polojärvi | 414/493 X |
| 5,246,330 | 9/1993 | Marmur et al. | 414/494 |

FOREIGN PATENT DOCUMENTS 2212787  8/1989  United Kingdom ................. 414/492

OTHER PUBLICATIONS

Bobko Industries "Long Haul II" brochure, Apr. 12, 1991.

*Primary Examiner*—David A. Bucci
*Attorney, Agent, or Firm*—Eckert Seamans Cherin & Mellott

[57] ABSTRACT

A plural container trailer has hydraulic systems for loading, unloading, and otherwise handling removable containers. The trailer has a bed long enough to carry two containers in line. The trailer has an undercarriage carrying a rear tilt frame. A forward mounted cable and winch system operates over the rear tilt frame to pull a first or forward container from the ground fully to a front docking position on the trailer bed. The forward cable remains connected to the forward container and it is not necessary to disengage a rear pulling mechanism and recouple the container to a front pulling mechanism. A second container-hoisting system loads and unloads a second container between the ground and the tilt frame. A slider mechanism engages against the front wall of the first container, and is moved forward as the first container is moved toward the front docking position. The slider mechanism drives the first container rearward, onto the empty tilt frame, for unloading the first container to the ground via the tilt frame and taut cable of the forward cable and winch system.

9 Claims, 5 Drawing Sheets

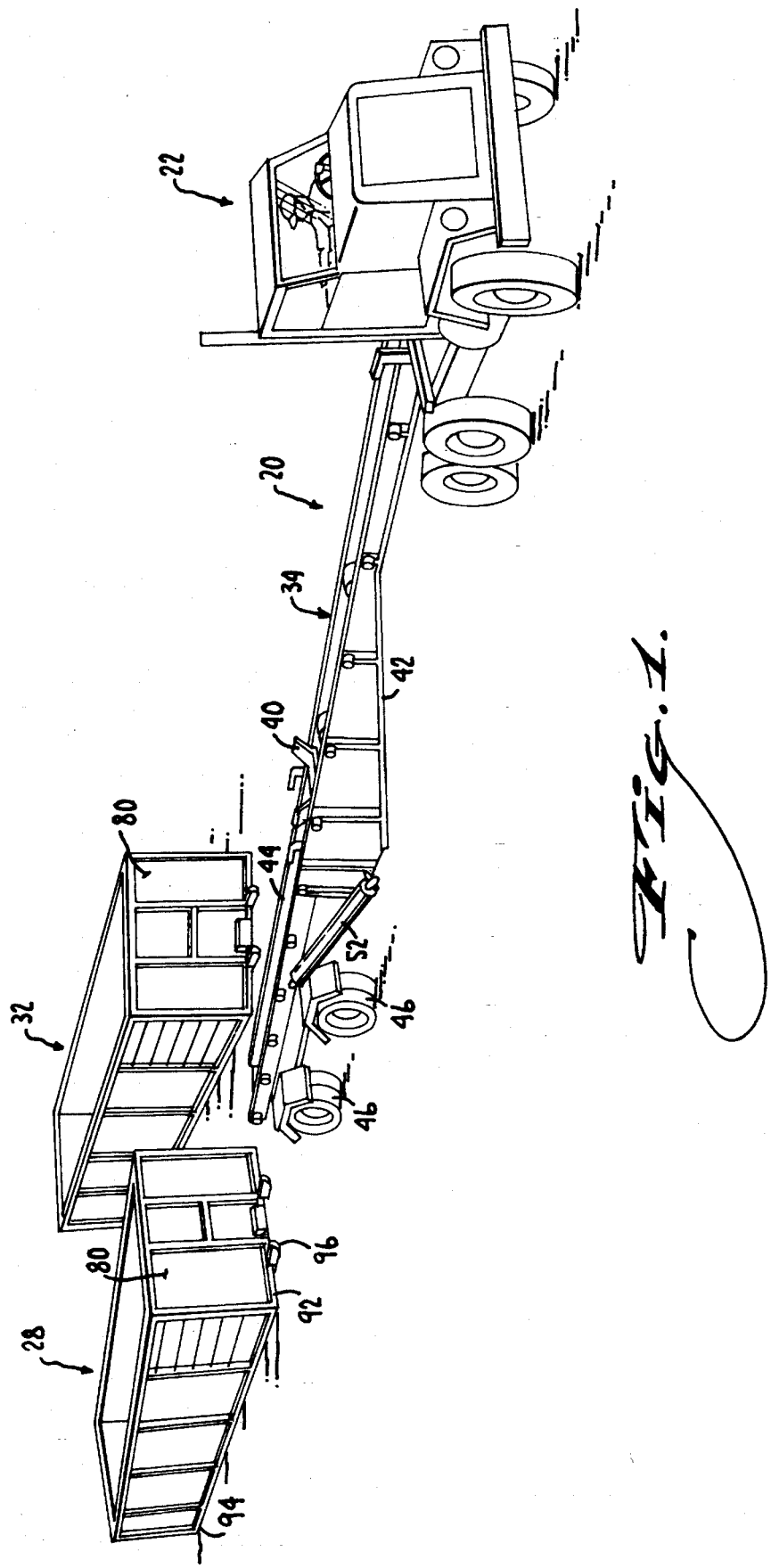

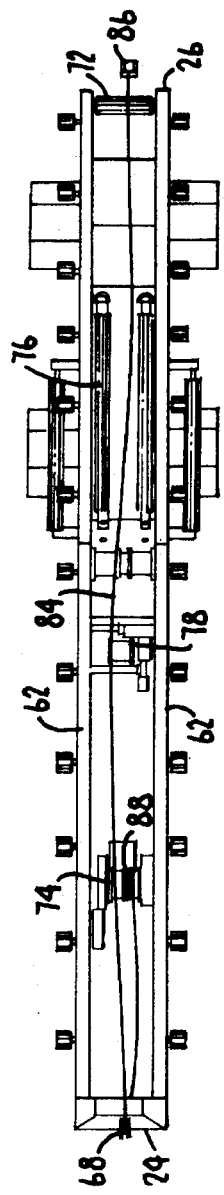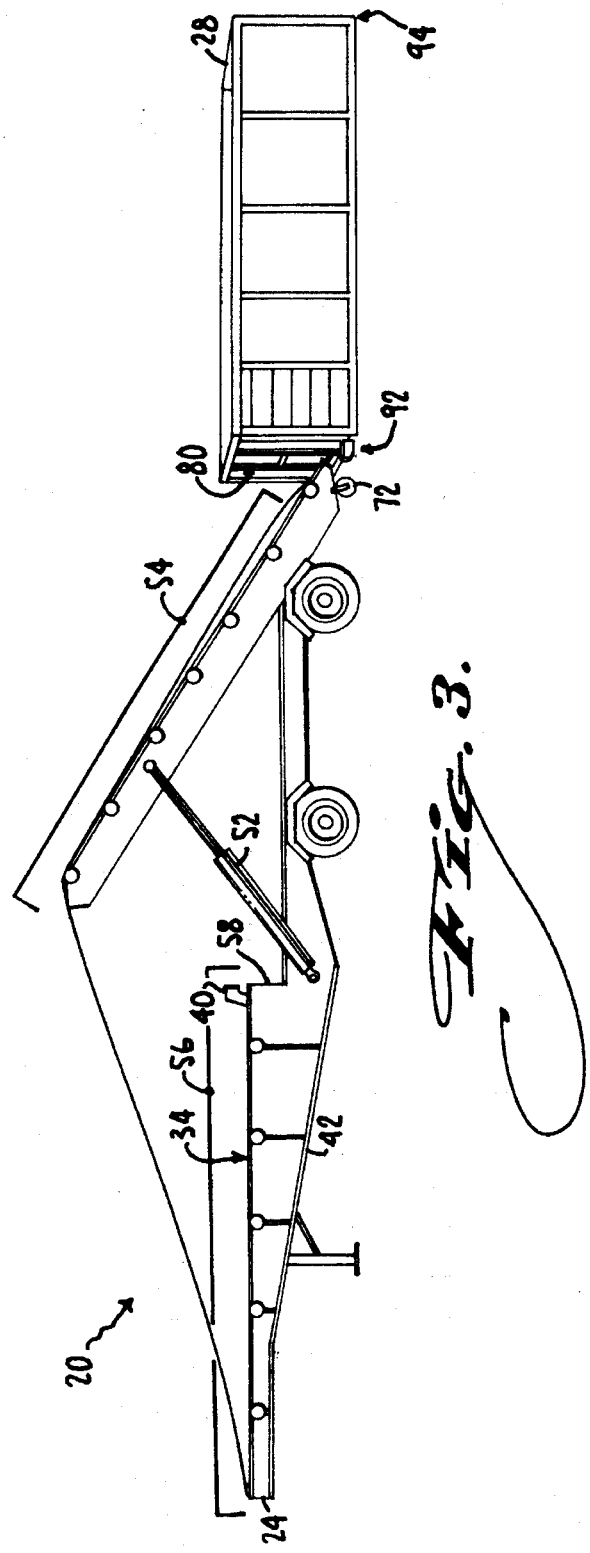

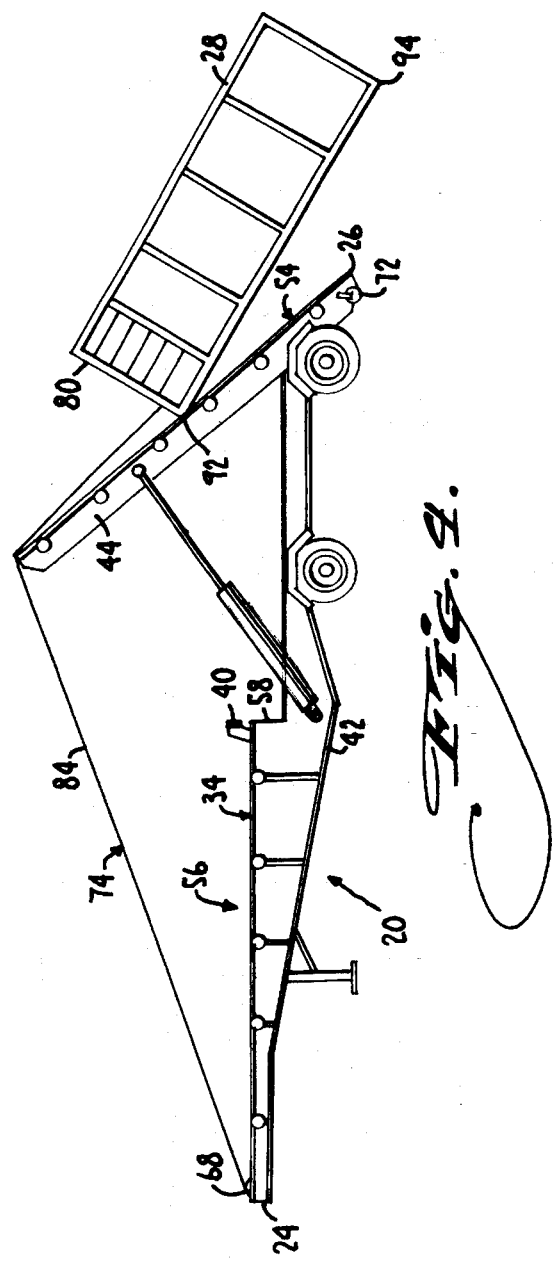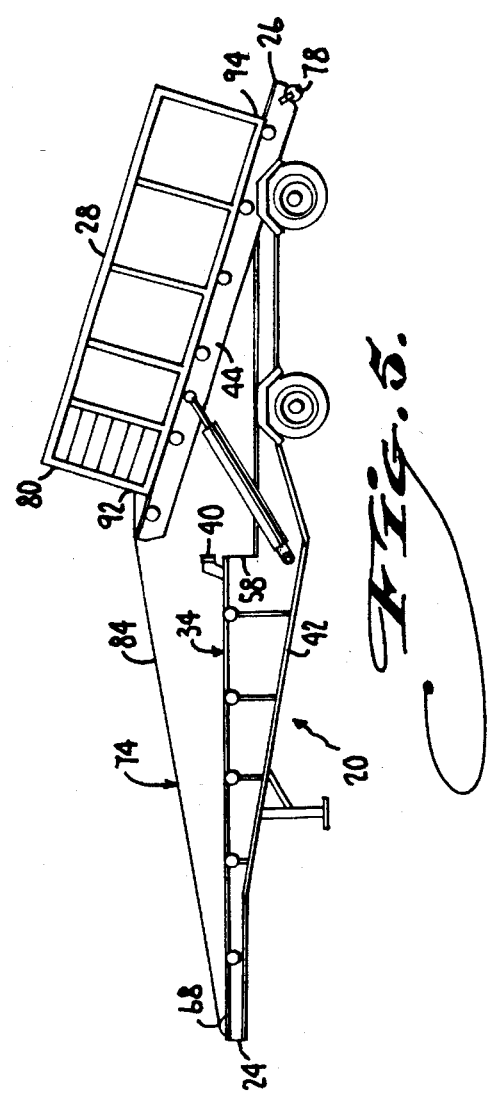

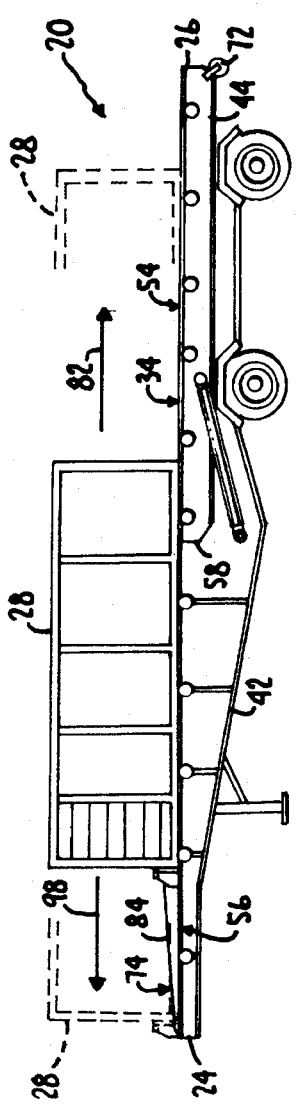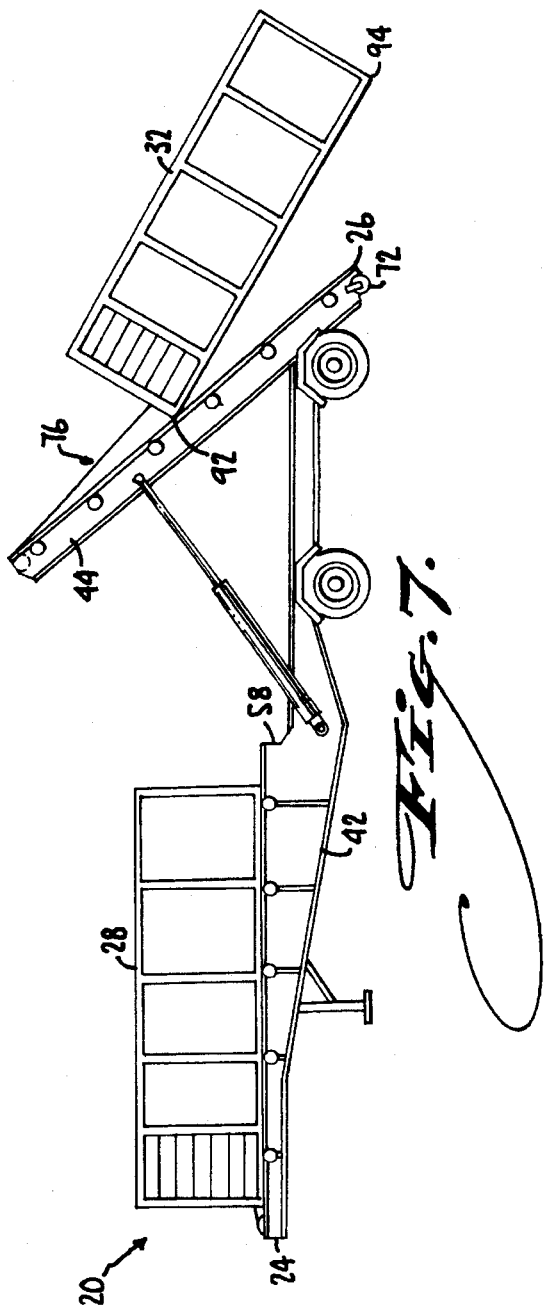

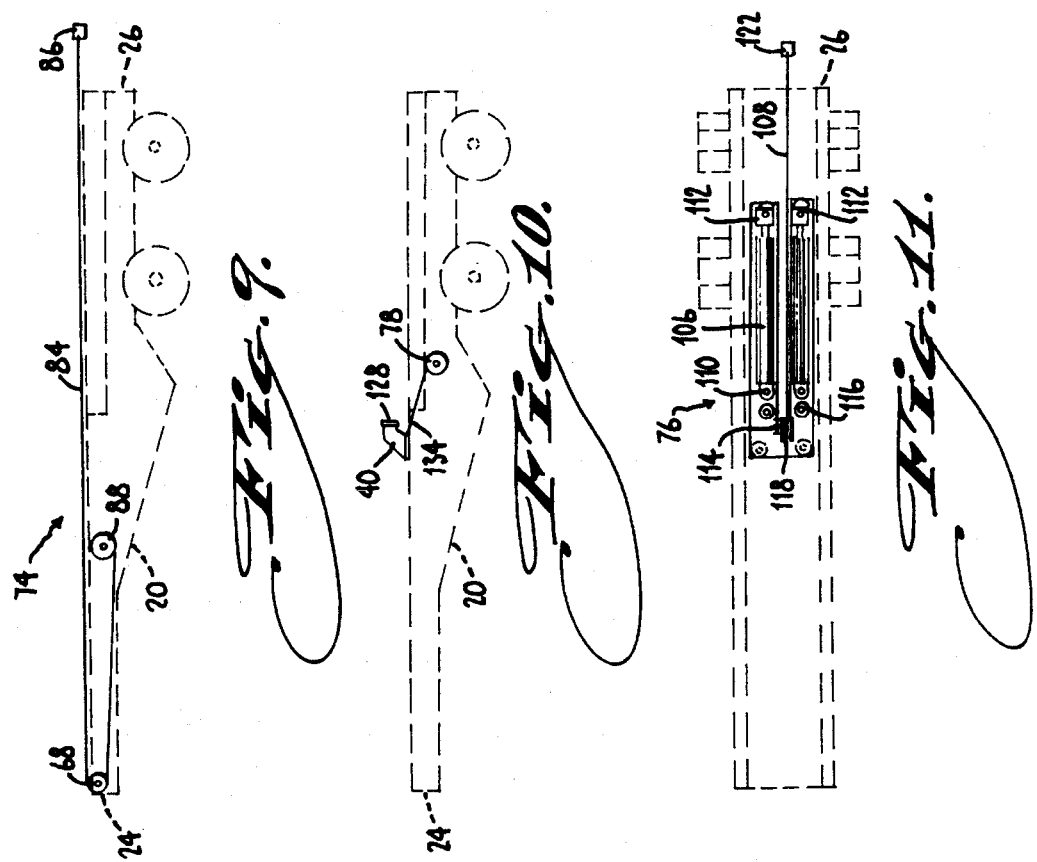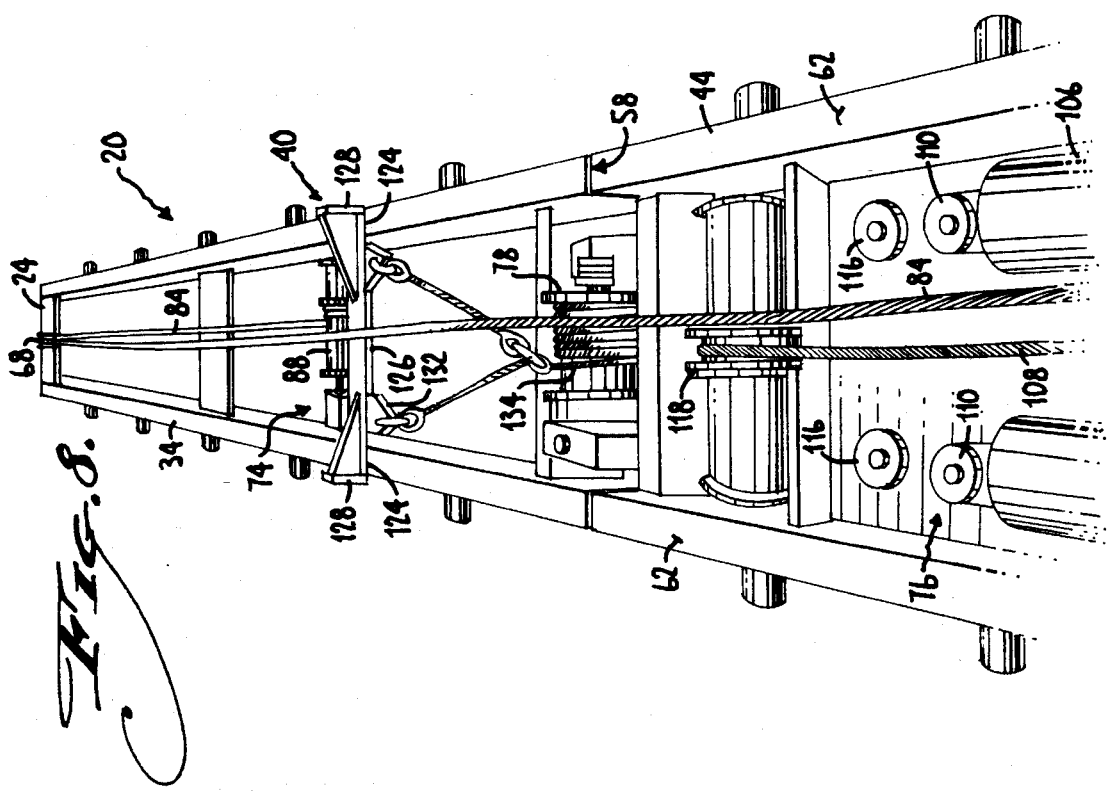

DOUBLE CONTAINER TRAILER

BACKGROUND OF THE INVENTION

1. Field of the Invention

The invention relates to the field of trailers having means for loading, unloading and transporting containers between locations such as storage terminals, job sites, dumping depots and the like. The invention concerns a trailer that carries two containers in line, and in particular provides a loading/unloading mechanism for a forward container that is distinct from that used for the rear container and includes a follower device whereby the front container can be moved to the rear container position.

2. Prior Art

Trailers for transporting removable containers between job sites, storage terminals, dumping depots and the like are known in industries such as the refuse and/or solid-waste/sludge handling industry, the intermodal shipping industry, etc. The trailers are towed by tractors, and are outfitted with hydraulic or electric systems for loading, unloading, or otherwise handling the removable containers. The trailer may be deployed, for example, to take an empty refuse container from a storage terminal to a job site where the container is left behind for the collection of refuse, solid waste and like material, and a full container may be removed and taken to a dumping depot, or back to the storage terminal, and so on.

It is known to provide a trailer of this kind with an undercarriage carrying a tilt frame. Tilt frames are movable between a level position for transport and an inclined position for loading and unloading from the rear of the trailer. In its inclined position, the tilt frame defines a ramp onto which a container resting on the ground can be hoisted, whereupon the tilt frame is lowered back to its level position for stably transporting that container over the road. To unload the container from the trailer, the tilt frame is tilted again to allow the container to slide off, as controlled by resistance offered by a taut cable and winch arrangement or the like.

For handling containers that are shorter than the trailer, means can be provided to carry two or more containers in line, head to toe. In a stretched trailer for plural containers, only the rear portion of the trailer needs to be tiltable for loading and unloading. The trailer bed typically has a front half defining a front docking position and a rear half defining a rear docking position. Mechanisms are provided to move a container forward or backward between the docking positions when the tilt frame is down.

Thus, the first container on a double container trailer is hoisted up the ramp of the tilt frame from the back end of the trailer. To do this, the tilt frame is inclined. A cable is attached to the container. The container is pulled up the inclined tilt frame by a hydraulic cylinder or hydraulic winch coupled to the cable. The tilt frame is lowered to the level position. The first container is then moved forward into the front docking position, clear of the tilt frame, which can be tilted again to pull up the second container. The second container is taken on in generally the same fashion and using the same pulling apparatus as before, but is not moved any farther forward than the rear docking position on the tilt frame.

Whereas there are two containers to be handled, and the front one needs to be moved forward and backward to clear the tilt frame, there are complications in the driving structures needed. Known double container trailers use various methods to move the first container between the front and rear docking positions (onto or off of the horizontally disposed tilt frame). Such methods may employ as many as three driving systems, each with an independent cable arrangement mounted at a different point on the trailer and terminating in a connector end attachable to one or the other of the containers at one end or the other. For instance, one cable system hoists the container up the inclined ramp of the tilt frame (and eases it down by gravity when unloading). In view of the power needed to pull a full container up the incline, a relatively powerful hydraulic mechanism may be needed. The cable is pulled from a point at the forward end of the tilt frame, e.g., at a pulley or winch, such that the container is drawn up to that point. After the tilt frame is moved to horizontal, the first cable is detached and a second cable is attached for moving the container forwardly, beyond the pulley or the like from which the first cable was pulled. This cable system pulls from the front of the front docking position to pull the container into place. A third system also is needed, namely to move the forward container from the front docking position to the rear docking position. This system pulls from the rear, or perhaps pushes from the front.

The fact that one portion of the trailer must tilt while the other is stationary, the different directions in which force must be applied, and the different endpoints from which force is applied, all contribute to the complexity of the hydraulic or other driving means, with the result being that the operator must tend to the attachment, detachment and stowing of various cables. It would be advantageous to achieve the necessary displacements of the containers without the need to attach and detach so many cable systems. These operations waste an operator's time, and increase the danger of the operation.

SUMMARY OF THE INVENTION

It is an object of the invention to provide a double container trailer with at least one cable system that is devoted to the front container and capable of loading a first container from a position on the ground to a position in the front docking portion of the trailer. In other words, an operator need only connect the first container to one cable system once in order to load and dock the first container in the front docking position, and this cable system works over the tilt section of the trailer.

It is another object of the invention to provide the above double container trailer with a reverse direction drive system to drive the container docked in the first docking position to a position on the tilt frame. The advantage gained here is that the operator still need not disconnect said one cable system from the first container.

It is still another object of the invention to provide a driven slider to operate as the above reverse direction drive system.

It is a further object of the invention to drive the slider via a cable and winch.

These and other aspects and objects are provided according to the invention in a double container trailer that extends between a back end and a front end. The trailer defines a generally level bed which is long enough between the back and front ends to carry two or more containers.

The trailer has a main frame and a tilt frame movably carried on the main frame for tilting through a range of positions between a level position and various tilted positions in which the tilt frame slopes downwardly in a direction from the front end to the back end. The tilt frame can be positioned by a pair of hydraulic cylinders connected between the main frame and the tilt frame, and additional hydraulic cylinders can be coupled to a cable forming a first rearward cable system for pulling a container onto the tilt frame.

The trailer has sets of cable systems for loading, unloading, and otherwise handling removable containers. A forward cable system that is independent of the first rear cable system is preferably used to load the first container on the trailer. The forward cable system is operable over the tilt frame (including while in its inclined position) and pulls from a point at the front of the trailer to pull a container into a front docking position on the trailer bed, defined by the main frame. The forward cable system is arranged to load a container via the following steps. The tilt frame is moved to the tilted position; the cable is connected to the container on the ground; and the container is hoisted onto the tilt frame using the tilt frame as a ramp. The tilt frame is lowered to a horizontal position (which operation can be carried on while pulling the container forward). When the tilt frame is horizontal, and thereby aligned with the main frame, the container is pulled forward by this same forward cable system, moving off the tilt frame to dock at the front docking position. It is advantageous that the first container is moved through the full range of position via the single cable system, which remains connected to the first container.

A rearward cable system is provided to hoist up a second container off the ground onto the tilt frame, independent of the forward cable system. By these operations, two containers are loaded onto the double container trailer. The rearward cable system remains connected to the rear container.

To clear the rear position (i.e., to offload the rear container), the tilt frame is moved from the level position to the inclined position. The rearward cable system is paid out and the rear container is lowered to the ground in a controlled manner.

Unloading the first container from the tilt frame is achieved in a similar manner, except using the front cable system to pay out cable while lowering the container. It is an aspect of the invention, however, that the front container is moved to the rear position on the tilt frame using a novel sliding mechanism which is engaged and moved forward when the first container is moved forward, and which is winched rearward to move the front container onto the tilt frame for offloading.

In accordance with the invention, the trailer has a slider associated with the front docking portion for driving the first container from a position on the front docking portion to a position on the tilt frame. The slider slides back and forth along the front docking portion of the trailer bed between the front end and a partition adjacent the tilt frame. The slider has a bearing surface that protrudes above the level plane of the bed. The bearing surface of the slider is shaped and arranged for abutting against a front wall of the first container as it is docked on the front docking portion. The slider is pulled in the rearward direction from the front end to the partition by a cable and winch, such that the slider thereby has a unidirectional power stroke.

When the front container position is empty, the slider waits in position next to the partition until a container that is being moved off the tilt frame and onto the front docking portion abuts against the slider and carries it forward. As the forward cable system continues to move that container further onto the front docking portion, the container correspondingly moves the slider to the front end of the trailer. In reverse use, the slider is powered to move rearwardly, and correspondingly drive against the front wall of the container, to drive the container off the front docking portion and onto the tilt frame. The position from which the slider cable is winched is necessarily slightly forward of the end of the tilt frame. However, the slider is operable to move the center of gravity of the container onto the tilt frame. When tilted, the container can be lowered to the ground via tilting of the tilt frame and controlling the rate of descent of the container via cable tension through the forward cable system.

Whereas the driving system has individual cables devoted to each of the containers, and means for moving the front container rearwardly onto the tilt frame, there are no disconnections and reconnections required of the operator. The entire operation can be accomplished and controlled by a control station along the side of the trailer, with means for applying tension to the cable systems while pulling in or paying out the front and rear cable systems and for pulling the slider rearwardly.

A number of additional objects and aspects of the invention will be apparent in connection with the following discussion of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings, FIG. 1 is a perspective view of a double container trailer according to the invention, shown hitched to a tractor and oriented to take on two containers on the ground.

FIG. 2 is a top plan view of the double container trailer.

FIGS. 3–7 show two containers being loaded onto the trailer in successive stages, wherein:

FIG. 3 is a side elevational view showing the initial stage of loading a first container onto the trailer;

FIG. 4 is a view corresponding to FIG. 3 except that the first container is partly on the tilt frame, partly off the ground, FIG. 5 is a view corresponding to FIG. 4 except that the first container is stably positioned on the tilt frame, which is in the process of lowering down to a level position, FIG. 6 is a view corresponding to FIG. 5 except that the first container is disposed in an intermediate position on the trailer bed, and, FIG. 7 is a view corresponding to FIG. 6 except that first container is docked in the front docking position and a second container is shown in the initial stages of being loaded.

FIG. 8 is a top perspective view of the trailer, partly broken away, looking in the direction of the front of the trailer.

FIG. 9 is a side elevational view of the forward cable and winch system, with the trailer shown in broken line.

FIG. 10 is a side elevational view of the slider and winch system, with the trailer shown in broken line.

FIG. 11 is a top plan view of the rearward cable and cylinder system, with the trailer shown in broken line and partly broken away.

DETAILED DESCRIPTION OF THE PREFERRED EMBODIMENTS

In FIG. 1, a double container trailer 20 according to the invention is hitched to a tractor 22 for moving between job sites, storage terminals, dumping depots and the like. The trailer 20 extends between a front end 24 next to the tractor 22 and a back end 26 near two containers 28, 32 resting on the ground. The trailer 20 has a bed (or upper surface) 34, which bed 34 is long enough between the ends 24 and 26 that two containers can be carried thereon in a head to toe fashion (e.g., FIG. 7). In FIGS. 1 and 3, a useful aspect of the trailer 20 according to the invention includes a slider 40 and its accompanying operating mechanism, as will be more fully described and explained below.

The illustrated containers 28 and 32 are typical of containers in the refuse and/or solid-waste/sludge handling industry. The containers can be open-topped or closed as necessary for the application. An example of an appropriate application is the removable container of a stationary refuse compaction system. However, the teachings of the invention are not limited to containers associated with this industry alone or to open rectangular containers either, because the teachings of the invention apply to various other containers or objects that are carried on tractor-driven trailers for delivery and drop off between remote locations.

In FIGS. 1–3, the trailer 20 comprises a framework including a main frame 42 and a tilt frame 44 (FIG. 3). The main frame 42 is partly carried (i.e., in the rear) on four-tire double axles 46 and partly carried in the front by either the tractor 22 via a hitch (FIG. 1) or by supplemental legs 48 (FIG. 3) that can be retracted out of the way during towing. The tilt frame 44 is pivotally attached to the main frame 42 at horizontal a pivot axis adjacent the rearward set of axles 46, and is movable through a range of positions, including a level position (FIG. 1) and various degrees of incline (e.g., FIGS. 3 and/or 4), via hydraulic actuators 52.

The tilt frame 44 defines a rear docking position 54. Rear docking position 54 constitutes about half of the length of bed 34 of trailer 20, and is where one of two containers is docked and carried during transport. The main frame 42 defines a complementary front docking position 56 on the front half of bed 34. The front docking position 56 terminates rearwardly in a partition 58, shown in FIG. 3, with the tilt frame 44. The front docking position 56 is level with the upper surface of the tilt frame 44 while in the level position of FIG. 1.

Preferably the trailer 20 is deployed to carry two containers in the front and rear docking positions 54 and 56, respectively. However, the trailer 20 can be alternatively used to carry one container in either position on the bed 34, or as centered on the partition 58, to achieve a desired weight distribution for open road travel.

As shown in FIG. 2, trailer 20 defines a rectangular box shape in plan view, with left and right frame members 62 extending between front and back crossbars at the ends 24 and 26, respectively. The cross-bar at the front end 24 carries an idler pulley 68, and the crossbar at the rear end 26 carries a ground-engaging roller 72 (e.g., FIG. 3). The left and right frame members 62 support several cross-members intermediate the front and back ends 24 and 26, including brackets and the like carrying a front cable and winch system 74, a rear cable and cylinder system 76, and an intermediate winch 78 for operating the slider 40 (FIG. 3).

FIGS. 3–7 show the steps deploying the double container trailer 20 to load and dock two containers. In FIG. 3, the back end 26 of the trailer 20 is positioned close to an end wall 80 (or a front one of the end walls) of the container 28. The tilt frame 44 is tilted to slope downwardly in the direction of arrow 82 in FIG. 6 (e.g., from the front end 24 to the back end 26). The forward cable and winch system 74 includes a cable 84 terminating in a connector end 86 opposite the winch 88. The cable 84 is uncoiled from the winch 88 to where the connector end 86 reaches a mating receptacle on the container 28. The tilt frame 44 is repositioned slightly such that the roller 72 on the back end 26 is adjacent the ground. In consequence, the tilt frame 44 in FIG. 4 slopes downwardly relative to FIG. 3 at a relatively steeper angle.

In FIG. 4, a container 28 destined for the front docking position is being hoisted up via the power of winch 88, which pulls from the idler pulley 68 at the front end of the trailer. Container 28 is tipped up so that its front edge 92 slides along the left and right frame members 62 of the tilt frame 44 as the container's back edge 94 remains at ground level. Each front and back edge 92 and 94 of the container 28 or 32 may have rollers 96, preferably with a wheelbase wider than the left and right frame members 62 so that the rollers 96 do not roll on the spaced frame members 62. In other words, the front edge 92 of the container 28 preferably slides frictionally on the spaced members 62 of the tilt frame 44 as the container 28 is hoisted up. Rollers 96 are provided mostly for displacing the container 28 or 32 across generally level ground, so that the edges of the container do not dig into the surface. The rollers 96 on the back edge 94 of the container 28 or 32 sometimes enable the back edge 94 to roll toward the trailer 20 as the container 28 or 32 is being hoisted up. But the weight of a filled container may fix the back edge 94 in place, and consequently the tractor and trailer rig 20 and 22 also may "come to" a filled container rather than vice versa. The rollers 96 on the back edge 94 of the container 28 or 32 accommodate a pivoting action of the container 28 or 32 on the back edge 94.

In FIG. 5, the container 28 is docked in the rear docking position 54 on the tilt frame 44 simultaneously as the tilt frame 44 is changing positions, ending in a horizontal position level with the from docking portion 56 of the bed 34. In FIG. 6, the tilt frame 44 is in the horizontal position and the container 28 is being drawn forward (i.e., in the direction of arrow 98) across the partition 58 toward the front docking position. This operation of loading and docking the container 28 destined for the front docking position is accomplished entirely by use of winch 74, whose cable is wound around pulley 68.

Returning to the slider 40, slider 40 has portions protruding up beyond the plane of the bed 34 (e.g., FIGS. 3–7) to engage container 28. The slider 40 is movable between a rear position slightly forward of partition 58 (FIGS. 3–5) and a front position adjacent the front end 24 (FIG. 7). As the container is winched forward, slider 40 is carried along. In FIG. 6, the front edge or wall 92 of the container 28 is abutting and driving the slider 40 in the forward direction 98 as the container 28 is simultaneously pulled along to the front docking position 56 via the forward cable and winch system 74.

In FIG. 7, first container 28 has been docked in the front docking position 56 of the bed 34. Hold-downs or connectors (not shown) can be provided to secure first container 28 in the front docking position 56, and corresponding hold-downs or connectors adjacent the partition 58 can operate in the same fashion except to act on a second container 32 in the rear docking position 54. FIG. 7 shows the rear cable and cylinder system 76 in operation, namely hoisting second container 32 into the rear docking position 54. As above, container 32 is lifted along the tilt frame, and the tilt frame is lowered back to horizontal either after or during lifting of container 32.

FIGS. 8 and 9 show details of the forward cable and winch system 74, which includes winch 88 and cable 84. The cable 84 uncoils from winch 88 and extends in the forward direction 98 to a half-loop around the pulley 68 on the front end 24. Cable 84 then extends rearward in direction 82 to the connector end 86 (near the back end 26 of the trailer 20 in FIG. 9).

In FIGS. 8 and 11, the rearward cable and cylinder system 76 comprises a pair of independently operable cylinders or actuators 106 and a corresponding cable 108. Each cylinder 106 is fixed to the tilt frame 44 at a forward cylinder end 110 and carries an extendible piston rod that terminates rearwardly in a pulley block 112. The cable 108 has a fixed end 114 fixed to the tilt frame 44 between the fixed ends 110 of the of the cylinders 106. The cable 108 is arranged in two complete loops, namely one loop in which the cable 108 circumferentially extends around one of the two pulley blocks 112 (FIG. 11) and a pair of idler pulleys 116 (e.g., FIG. 8), the other loop being around the other of the pulley blocks 112 (FIG. 11) and a sheave 118 (FIG. 8) mounted on a crossbar near the partition 58. From the sheave 118, the cable 108 extends rearwardly to a connector end 122 (adjacent the back end 26 of the trailer 20 in FIG. 11). By this arrangement, extension or retraction of either of the cylinders 106 correspondingly causes twice the retraction or extension in the cable 108. Thus, if each cylinder 106 should have a 10 foot (3 m) stroke, then the cable 108 correspondingly is retractable by 40 feet (12 m).

An alternative for the rearward cable and pulley system 76 can be a bail hook system, of which a representative bail hook system is disclosed by U.S. Pat. No. 4,802,811—Nijenhuis, incorporated fully herein by reference.

A particularly useful aspect the double container trailer 20 is the slider 40 and its drive system, which are shown by FIGS. 8 and 10. The slider 40 comprises a pair of nylon runners 124, a crossbeam 126 extending between the runners 124, and a pair of abutment members 128 extending up from the runners 124 and crossbeam 126. Each runner 124 has an inverted-L shape, and together they are positioned relative to the upper surfaces of the left and right frame members 62 to slide back and forth in tongue and groove fashion. The crossbeam 126 carries a pair of eye loops 132 for the attachment of a cable harness that is attached to a cable 134 coiled around the intermediate winch 78.

The slider 40 has a power stroke in the rearward direction 82 (FIG. 6), but not the forward direction 98. As shown in FIG. 6, the first container 28 drives the slider 40 in the forward direction 98 to move the slider 40 from a retracted position adjacent the partition 58 to an extended position adjacent the front end 24. During this change in position in the slider 40, the cable 134 merely uncoils off the free-spooling winch 78.

Slider 40 is operative to move first container 28 from the front docking position 56 (e.g., FIG. 7) to a position mostly on the tilt frame 44. Afterwards, the tilt frame 44 can be tilted either to unload the first container 28 off the bed 34 of the trailer 20 by gravity, or perhaps to dump the contents of container 28 out the rear while keeping the container 28 on the trailer bed 34.

Slider 40 obviates the need for an additional cable system that must be attached to the rear of the first container 28 for pulling it back onto the tilt frame. Operator time is conserved in avoiding the steps of connecting a cable to the rear edge of the front container in order to move it off the front docking position and onto the tilt frame, and disconnecting that cable to unload the container off the trailer bed by switching to the rear cable system.

The forward cable system 74 hoists the first container 28 through a full range of a positions between a position off the trailer and a position on the front docking position 56. This advantage is also a time-saver as it saves time otherwise required to coordinate the use of two cable systems for the same job done by the one 74.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A double container trailer comprising:

a wheeled main frame, extending between a back end and a front end, defining a partition between the front and back ends and a generally planar front docking portion between the front end and the partition;

a tilt frame carried on the main frame between the partition and the back end;

tilting means for tilting the tilt frame through a range of positions between a planar position coplanar with the front docking portion and inclined positions in which the tilt frame slopes downwardly in a direction of front to back;

a cable system, associated with the front end of the main frame, including a corresponding cable, the cable extending rearwardly from the front end to terminate in a connector for connecting to a first container;

container-hoisting means for loading a second container from a position off the trailer to a position upon the tilt frame and unloading the second container off the trailer; and, container-moving means for moving the first container from the front docking portion to the tilt frame;

wherein the cable system has one operating mode to load the first container from a position off the trailer to a position upon the front docking portion, traversing the tilt frame, and another operating mode to unload the container from upon the front docking portion to off the trailer, reverse traversing the tilt frame;

the cable system being arranged such that, during a continuous connection between the first container and the connector therefor, said one and another operating modes (1) are serially executable and (2) permit intervening loading and unloading of the second container;

wherein the container-hoisting means comprises a connector for the second container and the combination of the cable system and container-moving means are arranged to permit said connector for the second container to be idle during loading and unloading of the first container.

2. The trailer of claim 1, wherein the container-moving means comprises:

a slider with portions protruding relatively up from the generally planar front docking portion, carried on the main frame for reversible movement along the front docking portion between a position adjacent the front end and a position adjacent the partition, a cable that has one end fixed to the slider, and, an apparatus connected to the cable fixed to the slider, the apparatus having at least a unidirectional power stroke from an extended and to a retracted position corresponding to the slider associating with the front end and partition respectively.

3. The trailer of claim 2, wherein the apparatus is a cable winch.

4. The trailer of claim 1, wherein the tilt frame and the front docking portion are generally of equal length and are dimensioned such that the trailer can carry the first and second containers simultaneously.

5. The trailer of claim 1, wherein the cable system comprises an apparatus that is connected to the cable and has at least a unidirectional power stroke from an extended and to a retracted position corresponding to the connector for the first container associating with the back and front ends respectively of the main frame.

6. The trailer of claim 5, wherein the apparatus comprises a cable winch.

7. The trailer of claim 1, wherein the tilting means comprises:

a pivotal connection between the main frame and the tilt frame, and, an actuator that has extended and retracted positions, and has one end pivotally connected to the main frame and an opposite end pivotally connected to the tilt frame, wherein extension and retraction of the actuator induces corresponding changes in relative inclination of the tilt frame in respectively reverse directions.

8. The trailer of claim 1, wherein the container-hoisting means further comprises another cable system which comprises another cable and a power cylinder, the power cylinder has a reversible power stroke and includes a piston rod terminating in a pulley block, said other cable has one end fixed to the tilt frame and extends through the pulley block to terminate in said connector for the second container, and, wherein changes in position in said pulley block cause twice the change in position in said connector for the second container.

9. The trailer of claim 1, further comprising means for releasably hitching the trailer to a towing vehicle.

* * * * *